United States Patent
Xing et al.

(10) Patent No.: US 12,022,434 B2
(45) Date of Patent: Jun. 25, 2024

(54) RESOURCE SELECTION METHOD AND DEVICE

(71) Applicant: ZTE CORPORATION, Shenzhen (CN)

(72) Inventors: Weimin Xing, Shenzhen (CN); Youxiong Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 16/760,149

(22) PCT Filed: Jan. 23, 2019

(86) PCT No.: PCT/CN2019/072768
§ 371 (c)(1),
(2) Date: Apr. 29, 2020

(87) PCT Pub. No.: WO2019/149117
PCT Pub. Date: Aug. 8, 2019

(65) Prior Publication Data
US 2020/0344721 A1    Oct. 29, 2020

(30) Foreign Application Priority Data
Feb. 5, 2018    (CN) .......................... 201810111550.9

(51) Int. Cl.
*H04W 72/02*    (2009.01)
*H04W 72/53*    (2023.01)
(Continued)

(52) U.S. Cl.
CPC .......... *H04W 72/02* (2013.01); *H04W 72/53* (2023.01); *H04W 80/02* (2013.01); *H04W 92/18* (2013.01)

(58) Field of Classification Search
CPC . H04W 72/02; H04W 72/0493; H04W 72/04; H04W 80/02; H04W 92/18; H04L 5/00; H04L 5/16
See application file for complete search history.

(56) References Cited

U.S. PATENT DOCUMENTS

2017/0150490 A1*  5/2017  Chen .................... H04W 88/06
2018/0049084 A1*  2/2018  Lee ...................... H04W 72/02
(Continued)

FOREIGN PATENT DOCUMENTS

CN    103560971 A    2/2014
CN    106717052 A    5/2017
(Continued)

OTHER PUBLICATIONS

International Search Report for International Application No. PCT/CN2019/072768 dated Apr. 10, 2019; 4 pages.
(Continued)

*Primary Examiner* — Jianye Wu
(74) *Attorney, Agent, or Firm* — BOND, SCHOENECK & KING, PLLC; George R. McGuire

(57) ABSTRACT

Provided are a resource selection method and device. The method includes initiating at least one sidelink process on at least one carrier; determining that the at least one sidelink process is one set of sidelink processes; and triggering, according to a preset rule, resource selection of the one set of sidelink processes.

13 Claims, 3 Drawing Sheets

(51) Int. Cl.
H04W 80/02 (2009.01)
H04W 92/18 (2009.01)

(56) References Cited

U.S. PATENT DOCUMENTS

| 2018/0213438 | A1* | 7/2018 | Muraoka | H04W 72/0446 |
| 2020/0267041 | A1* | 8/2020 | Kim | H04L 1/00 |
| 2020/0287674 | A1* | 9/2020 | Tang | H04W 72/04 |
| 2020/0359368 | A1* | 11/2020 | Loehr | H04W 72/0446 |

FOREIGN PATENT DOCUMENTS

| CN | 107040557 A | 8/2017 |
| CN | 107615844 | 1/2018 |
| CN | 107615844 A | 1/2018 |
| WO | 2017075798 | 5/2017 |

OTHER PUBLICATIONS

Huawei et al: "Analysis on resource allocation for PC5 CA", 3GPP Draft; R2-1712752 Analysis on Resource Allocation for PC5 CA, 3rd Generation Partnership Project (3GPP), Mobile Competence Centre;650, Route Des Lucioles; F-06921 Sophia-Antipolis Cedex; France; vol. RAN WG2, No. Reno, USA; Nov. 27, 2017-Dec. 1, 2017; Retrieved from the Internet: URL:http://www.3gpp.org/ftp/tsg%5Fran/WG2%5FRL2/TSGR2%5F100/Docs/.

LG Electronics Inc: "Corrections to resource allocation in Sidelink Mode 4", 3GPP Draft; R2-168405 MAC Correction—Resource Allocation, 3rd Generation Partnership Project (3GPP), Mobile Competence Centre; 650, Route Des Lucioles; F-06921 Sophia-Antipolis Cedex; France; vol. RAN WG2, No. Reno, USA; Aug. 14, 2016-Aug. 18, 2016; Retrieved from the Internet: URL:http://www.3gpp.org/ftp/tsg_ran/WG2_RL2/TSGR2_96/Docs/.

Intel Corporation: "Sideline Carrier Aggregation for Mode-4 LTE V2V Communication", 3GPP Draft; R1-1717330—Intel—V2X_SLCA_M4, 3rd Generation Partnership Project (3GPP), Mobile Competence Centre; 650 Route Des Lucioles; F-06921 Sophia-Antipolis Cedex; France; vol. RAN WG1, No. Prague, Czech Republic; Oct. 9, 2017-Oct. 13, 2017; Retrieved from the Internet: URL:http://www.3gpp.org/ftp/tsg_ran/WG1_RL1/TSGR1_90b/Docs/.

Samsung: Other considerations on V2X CA:, 3GPP Draft; R1-1720251 CA Others, 3rd Generation Partnership Project (3GPP), Mobile Competence Centre; 650 Route Des Lucioles; F-06921 Sophia-Antipolis Cedex; France; vol. RAN WG1, No. Reno USA Nov. 27, 2017-Dec. 1, 2017 XP051369885, Retrieved from the Internet: URL:http://www.3gpp.org/ftp/tsg%5Fran/WG1%5FRL1/TSGR1%5F91/Docs/.

CATT: "Discussion on carrier aggregation for mode 4 in V2X Phase 2", 3GPP Draft; R1-1720158, 3rd Generation Partnerhsp Project (3GPP), Mobile Competence Centre; 650 Route Des Lucioles; F-06921 Sophia-Antipolis Cedex; France; vol. RAN WG1, No. Reno, USA; Nov. 27, 2017-Dec. 1, 2017 XP051369795, Retrieved from the Internet: URL:http://www.3gpp.org/ftp/tsg%5Fran/WG1%5FRL1/TSGR1%5F91/Docs/.

European Search Report, pp. 1-12. dated Jun. 21, 2021.

3GPP TSG-RAN WG2 #97, R2-1700784 Athens, Greece Feb. 13-17, 2017 Discussion on resources (re) selection related issues, pp. 1-4.

3GPP-TSG-RAN WG2 Meeting #100, R2-1712750 Reno, USA Nov. 27-Dec. 1, 2017 Agenda Iten 9.10.2, Huawei, HiSilicon Reconsideration on sideline HARQ entity and sidelink process in PC5 CA.

3GPP TSG RAN WG1 Meeting #91, R1-1720031 Reno, UA, Nov. 27-Dec. 1, 2017 Intel Corporation Physcial Layer Aspects of Sidelink Carrier Aggregation for Mode-4 LTE V2V Communication Agenda Item 6.2.3.1.1.

3GPP TSG RAN WG1 #91, R1-1720250 Reno, USA, Nov. 27-Dec. 1, 2017 Samsung Synchronization ibn V2X CA.

Translated Japanese Office Action, dated Jul. 3, 2021. pp. 1-4.
Original Japanese Office Action, pp. 1-3.
Translated Korean Office Action, dated Aug. 20, 2021, pp. 1-11.
Original Korean Office Action, pp. 1-9.
Translated CN First Search Report.
Translated CN OA 1, pp. 1-8.

* cited by examiner

RESOURCE SELECTION METHOD AND DEVICE

CROSS-REFERENCES TO RELATED APPLICATIONS

This is a U.S. National Stage Application, filed under 35 U.S.C. 371, of International Patent Application No. PCT/CN2019/072768, filed on Jan. 23, 2019, which claims priority to Chinese patent application No. 201810111550.9 filed on Feb. 5, 2018, contents of both of which are incorporated herein by reference in their entireties.

TECHNICAL FIELD

The present application relates to the field of communications, for example, to a resource selection method and device.

BACKGROUND

In the related art, in a sidelink communication system, when a service needs to be transmitted between user equipments (UEs), service data between UEs is not forwarded through a network, but transmitted from a data source UE to a target UE through sidelink. FIG. 1 is a schematic diagram of a sidelink communication structure according to the related art. In addition, according to the communication resource acquiring manner, sidelink communication is divided into two communication modes. In the first mode, resources on which a UE sends sidelink signals are scheduled by a base station. In the second mode, the UE autonomously selects the communication resources in a configured or preconfigured resource pool according to a resource selection policy. The resource selection policy includes a sensing mechanism, a partial-sensing mechanism and a random-selection mechanism.

As the demand for Internet of Vehicles and direct communication increases, the demand for sidelink communication systems in the market is increasing. For example, to improve the rate or reliability, sidelink communication needs to support carrier aggregation (CA), that is, to use multiple carriers for parallel transmission. The parallel transmission may be simultaneous or time division multiplexing (TDM). However, in the related art, difficulties occur in a carrier aggregation scenario. For example, in the related art, a sidelink process is primary, and resources used by one sidelink process belong to the same carrier; if resource selection and reselection are triggered for the sidelink process on each carrier in carrier aggregation independently, a serious half duplex (in the current standard and industry status, it is generally assumed that a terminal UE does not support simultaneous transmitting and receiving) occurs.

Specifically, if different carriers trigger resource selection or reselection at different times, then according to the sensing-based resource selection policy, different carriers are likely to select resources of different times. This is because due to the limitation by the half duplex, the UE cannot perform sensing (sensing is similar to receiving; if transmission is performed on other carriers at this time, sensing cannot be performed due to the half duplex) on time resources (subframes) that have been selected by other carriers. The resources that cannot be sensed are not available as candidate resources for the UE to select. For example, it is assumed that the UE performs transmission on two component carriers (CCs) CC#1 and CC#2. If resource selection is first performed on CC#1 and the time of subframe 1 is selected, then transmission on CC#1 is performed in subframe 1 and sensing cannot be performed on CC#2 in subframe 1. If resource selection is then performed on CC#2, only a subframe that is different from subframe 1 can be selected. Therefore, transmission by the UE occupies a longer time domain length. Due to the half duplex, when the UE performs transmission in a longer time domain length, the UE cannot perform sensing on this time domain length. A resource that cannot be sensed cannot be selected as a transmission resource according to the related sensing mechanism, and the UE cannot perform receiving in this time domain length. As a result, more data packets sent by the UE are lost. This problem is more serious in the case of more carriers aggregated.

In the sidelink communication system, information is transmitted between UEs by using sidelink resources. According to specific application scenarios and service types, the sidelink communication mode includes device-to-device (D2D) communication and vehicle-to-vehicle (V2V) communication. In sidelink communication, the network configures a sidelink resource pool for the UE or the system preconfigures the sidelink resource pool, and the UE carries sidelink information by using the resources in the sidelink resource pool.

In the related art, when the UE autonomously selects resources for communication in the configured or preconfigured resource pool according to the resource selection policy, the UE selects and reselects resources at a granularity of sidelink process. Since an important service in sidelink communication is a periodic broadcast service, when resources are selected for this service, the UE generally selects a set of periodically present resources to carry a sidelink process used by this service, and this set of resources may be referred to as one sidelink grant. When the UE performs autonomous resource selection, the case where the same resources are selected by UEs may occur. That is, a resource selection conflict occurs. If the UE does not change the resource position after selecting a set of periodic resources, a persistent resource conflict may be caused. If the UE performs resource reselection, this case may be avoided to some extent. The related art thus defines a series of trigger conditions for resource selection and reselection.

FIG. 2 is a schematic diagram of independent resource selection and reselection of each sidelink process after resource selection according to the related art. As shown in FIG. 2, a trigger condition for each sidelink process triggers resource selection and reselection of the each sidelink process independently. When the trigger condition for a certain sidelink process is satisfied, resource selection and reselection of this sidelink process are triggered. Resource selection/reselection may be performed by, but not necessarily by, a Media Access Control (MAC) entity or a Hybrid Automatic Repeat ReQuest (HARM) entity of a UE. Half duplex is likely to occur for resource selection/reselection triggered by the independent trigger condition for each sidelink process in a carrier aggregation scenario.

No effective solution has been provided to solve the problem of a serious half duplex caused by independent execution of each sidelink process on each carrier in carrier aggregation in the related art.

SUMMARY

The following is a summary of the subject matter described in detail herein. This summary is not intended to limit the scope of the claims.

Embodiments of the present application provide a resource selection method and device to avoid a serious half duplex caused by independent running of the sidelink process of each carrier in carrier aggregation in the related art.

According to one embodiment of the present application, a resource selection method is provided. The method includes initiating at least one sidelink process on at least one carrier; determining that the at least one sidelink process is one set of sidelink processes; and triggering, according to a preset rule, resource selection of the one set of sidelink processes.

According to another embodiment of the present application, a resource selection device is provided. The device includes an initiation module, which is configured to initiate at least one sidelink process on at least one carrier; a determination module, which is configured to determine that the at least one sidelink process is one set of sidelink processes; and a trigger module, which is configured to trigger, according to a preset rule, resource selection of the one set of sidelink processes.

According to another embodiment of the present application, a storage medium is provided. The storage medium stores a computer program. When the computer program is executed, the preceding method is performed.

According to another embodiment of the present application, an electronic device is provided. The electronic device includes a memory and a processor. The memory stores a computer program. The processor is configured to execute the computer program to perform the preceding method.

Other aspects can be understood after the accompanying drawings and detailed description are read and understood.

BRIEF DESCRIPTION OF DRAWINGS

The drawings described herein are used to provide a further understanding of the present application and form a part of the present application. The illustrative embodiments and description thereof in the present application are used to explain the present application and not to limit the present application in an improper manner. In the drawings.

DETAILED DESCRIPTION

The present application will be described hereinafter in detail with reference to the drawings and in connection with the embodiments. It is to be noted that if not in collision, the embodiments and features therein in the present application may be combined with each other.

It is to be noted that terms such as "first" and "second" in the description, claims and drawings of the present application are used to distinguish between similar objects and are not necessarily used to describe a particular order or sequence.

Embodiment One

The solution of this embodiment of the present application is applicable to point-to-point communication such as D2D communication and V2V communication. It is to be noted that the operating environment of the information transmission method provided in this embodiment of the present application is not limited to the preceding network architecture.

Figure 1:
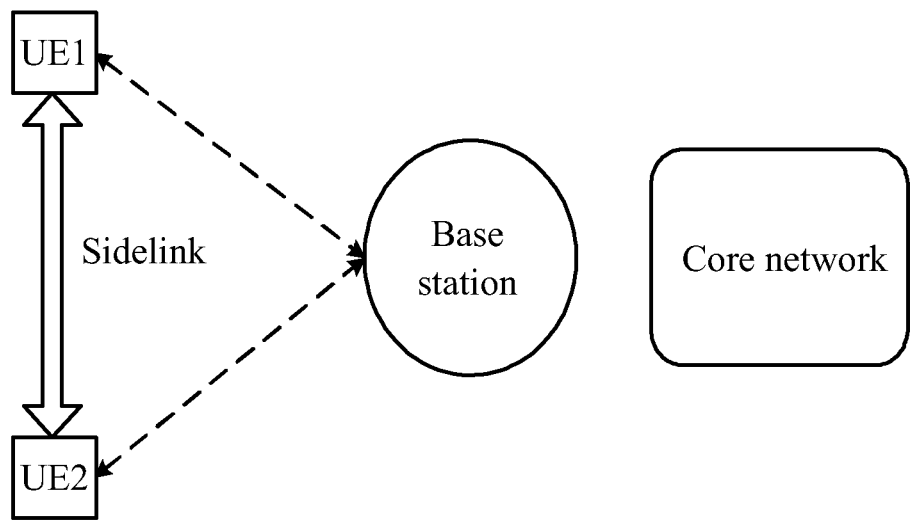
FIG. 1 is a schematic diagram of an architecture of sidelink communication according to the related art.
Figure 2:
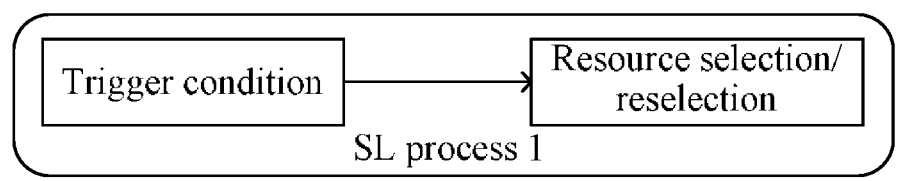
FIG. 2 is a schematic diagram of independent resource selection and reselection of each sidelink process after resource selection according to the related art.
Figure 2:
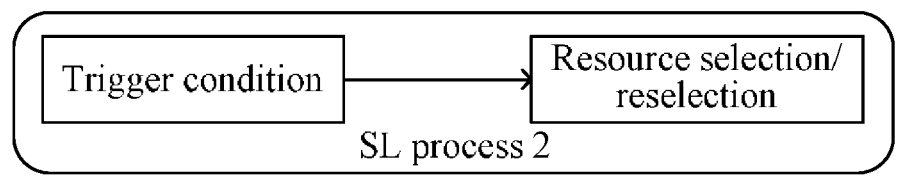
Figure 3:
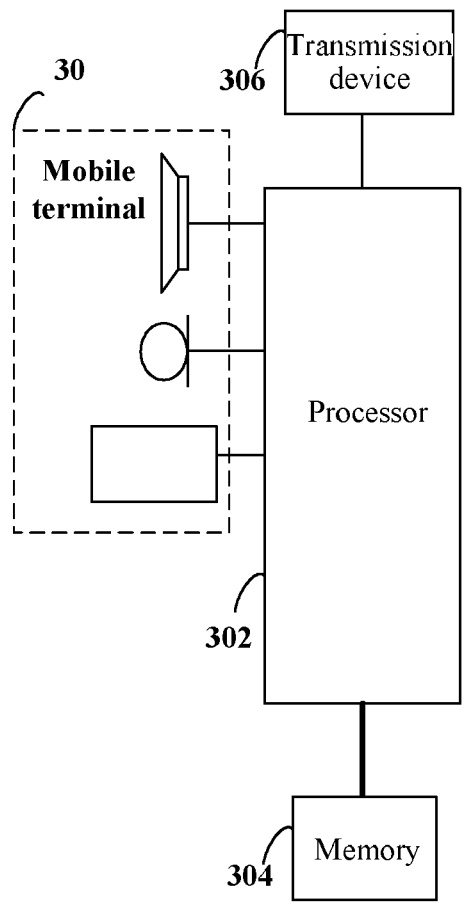
FIG. 3 is a block diagram illustrating a hardware structure of a mobile terminal for a resource selection method according to an embodiment of the present application.

The method embodiment provided in embodiment one of the present application may be performed in a mobile terminal, a computer terminal or a similar computing device. Using operation on a mobile terminal as example, FIG. 3 is a block diagram illustrating a hardware structure of a mobile terminal for a resource selection method according to an embodiment of the present application. As shown in FIG. 3, the mobile terminal 30 may include at least one (only one is shown in FIG. 3) processor 302 that may include, but is not limited to, a processing device such as a Microcontroller Unit (MCU) or a Field-Programmable Gate Array (FPGA), and a memory 304 configured to store data. In an embodiment, the mobile terminal may further include a transmission device 306 with communication functions. It will be appreciated by those of ordinary skill in the art that the structure shown in FIG. 3 is merely illustrative and does not limit the structure of the preceding mobile terminal. For example, the mobile terminal 30 may further include more or fewer components than shown in FIG. 3 or have a different configuration than shown in FIG. 3.

The memory 304 may be configured to store software programs and modules of application software, such as program instructions/modules corresponding to a resource selection method provided in this embodiment of the present application. The processor 302 executes software programs and modules stored in the memory 304 to perform various functional applications and data processing, that is, to implement the preceding method. The memory 304 may include a high-speed random access memory, and may further include a nonvolatile memory, such as one or more magnetic storage devices, flash memories or other nonvolatile solid-state memories. In some examples, the memory 304 may further include memories disposed remote from the processor 302. These remote memories can be connected to the terminal 30 via a network. Examples of the preceding network include, but are not limited to, the Internet, an intranet, a local area network, a mobile communication network and a combination thereof.

The transmission device 306 is configured to receive or send data via a network. Examples of the preceding network may include a wireless network provided by the communication provider of the mobile terminal 30. In an example, the transmission device 306 includes a network interface controller (MC) that may be connected to other network devices via a base station to communicate with the Internet. In an example, the transmission device 306 may be a radio frequency (RF) module configured to communicate with the Internet wirelessly.

Figure 4:
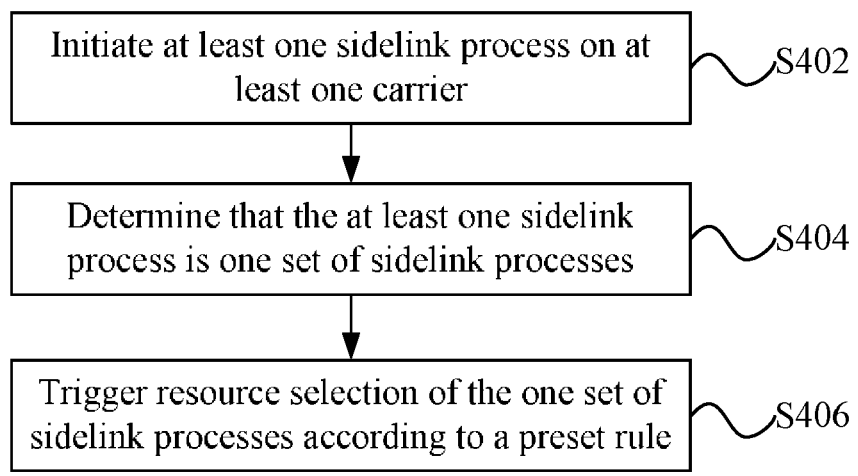
FIG. 4 is a flowchart of a resource selection method according to an embodiment of the present application.

In this embodiment, a resource selection method running on the preceding mobile terminal is provided. FIG. 4 is a flowchart of the resource selection method according to this embodiment of the present application. As shown in FIG. 4, the method includes steps S402, S404 and S406.

In step S402, at least one sidelink process is initiated on at least one carrier.

In step S404, it is determined that the at least one sidelink process is one set of sidelink processes.

In step S406, resource selection of the one set of sidelink processes is triggered according to a preset rule.

Additionally, the resource selection in the present application further includes resource reselection. In an embodiment, at least one sidelink process is initiated on one carrier or at least one sidelink process is initiated on multiple carriers.

Through the preceding steps, at least one sidelink process is initiated on at least one carrier; it is determined that the at least one sidelink process is one set of sidelink processes; and resource selection of the one set of sidelink processes is triggered according to a preset rule. In this way, a serious half duplex caused by the independent sidelink process of each carrier in carrier aggregation in the related art is avoided and achieves resource selection for one set of sidelink processes. Independent execution of the sidelink process of each carrier and the serious half duplex are avoided.

In an embodiment, the preceding steps may be performed by, but not necessarily by, a terminal or a vehicle.

In an embodiment, step S402, step S404 and step S406 may be performed in another sequence. That is, step S404 may be performed before step S402 is performed.

In an embodiment, triggering, according to the preset rule, the resource selection of the one set of sidelink processes includes at least one of: based on a determination that resource selection of one sidelink process in the one set of sidelink processes is triggered, triggering the resource selection of the one set of sidelink processes; according to a counter or a timer configured for the one set of sidelink processes in advance, triggering the resource selection of the one set of sidelink processes; or based on a determination that carrier selection corresponding to the one set of sidelink processes is performed or a resource pool corresponding to the one set of sidelink processes changes, triggering the resource selection of the one set of sidelink processes.

In an embodiment, the step of based on the determination that the resource selection of the one sidelink process in the one set of sidelink processes is triggered, triggering the resource selection of the one set of sidelink processes includes one of: determining that the triggering of the resource selection of the one sidelink process is used as a trigger condition for resource selection of other sidelink processes in the one set of sidelink processes other than the one sidelink process; or determining that the trigger condition for the resource selection of the other sidelink processes in the one set of sidelink processes other than the one sidelink process is identical with a trigger condition for the one sidelink process.

In an embodiment, the step of based on the determination that the resource selection of the one sidelink process in the one set of sidelink processes is triggered, triggering the resource selection of the one set of sidelink processes includes at least one of: based on a determination that the one sidelink process is a sidelink process of a preset set in the one set of sidelink processes, after the resource selection of the one sidelink process is triggered, triggering the resource selection of the one set of sidelink processes; in a case where the one sidelink process includes a plurality of trigger conditions, allowing some trigger conditions of the plurality of trigger conditions to trigger the resource selection of the one sidelink process and resource selection of other sidelink processes in the one set of sidelink processes other than the one sidelink process; or after determining that the resource selection of the one sidelink process is triggered, triggering resource selection of some sidelink processes in the one set of sidelink processes.

In an embodiment, the step of triggering, according to the preset rule, the resource selection of the one set of sidelink processes includes disabling some trigger conditions corresponding to some sidelink processes in the one set of sidelink processes. In an embodiment, the some sidelink processes are sidelink processes in the one set of sidelink processes other than the one sidelink process. It should be noted that, the disabled trigger conditions of the sidelink processes may be different from each other. For example, it is assumed that four processes are provided and each process has seven trigger conditions; trigger conditions 1, 2 and 3 of the first process are disabled and trigger conditions 2, 3 and 5 of the second process are disabled.

In an embodiment, the trigger condition of the sidelink process is disabled in at least one of the following manners: setting an enable flag for the trigger condition corresponding to the sidelink process; and in response to disabling one trigger condition corresponding to the sidelink process, setting the enable flag of the one trigger condition to "false"; or setting a reference value of the trigger condition corresponding to the sidelink process to a predetermined value. Additionally, the reference value may be an unusable value such as a value that is not specified by an international protocol or an international standard, and the setting effect is that the trigger condition cannot be triggered.

In an embodiment, the step of according to the counter or the timer configured for the one set of sidelink processes in advance, triggering the resource selection of the one set of sidelink processes includes one of: after determining that the counter reaches a preset value, triggering the resource selection of the one set of sidelink processes, where the counter is configured to count an associated-state variable or the execution number of an associated operation of the one set of sidelink processes; or after determining that the timer expires, triggering the resource selection of the one set of sidelink processes.

In an embodiment, the counter is configured to count the associated-state variable or the execution number of the associated operation of the one set of sidelink processes in one of the following manners: the counter is configured to count the number of independently-triggered resource selection of some or all sidelink processes in the one set of sidelink processes; the counter is configured to count the number of data transmissions of some or all sidelink processes in the one set of sidelink processes; the counter is configured to count the number of resource periods that the one set of sidelink processes passes since the previous resource selection; or the counter is configured to count the number of resources occupied by the one set of sidelink processes in one resource period, where the resources include at least one of a time domain resource, a frequency domain resource, a space domain resource or a code domain resource. Additionally, the number of resource periods and the number of occupied time domains may be associated-state variables.

In an embodiment, the determination that the carrier selection corresponding to the one set of sidelink processes is performed or the resource pool corresponding to the one set of sidelink processes changes includes one of: a determination that synchronization reference resources (including, but not limited to, positions of the synchronization reference resources and the number of the synchronization reference resources) configured for the resource pool corresponding to the one set of sidelink processes change; or a determination that carrier selection or carrier set selection (carrier reselection included) is performed for a carrier corresponding to the one set of sidelink processes, or a synchronization reference or a synchronization reference source of the carrier corresponding to the one set of sidelink processes changes.

In an embodiment, before determining that the carrier selection or the carrier set selection is performed for the resource pool corresponding to the one set of sidelink processes, the method further includes one of: based on the determination that resource selection of one sidelink process in the one set of sidelink processes is triggered, triggering the carrier selection or the carrier set selection; in response to determining that carrier selection is performed for some carriers in a carrier set or resource selection is performed for some sidelink processes in the one set of sidelink processes, triggering the carrier set selection of the carrier set; or according to the preset counter or timer, triggering the carrier selection or the carrier set selection, where the counter is configured to count the execution times of the associated operation of the one set of sidelink processes.

In an embodiment, determining that at least one sidelink process is one set of sidelink processes includes one of: determining that a plurality of sidelink processes for transmitting data of a same logical channel are one set of sidelink processes; determining that a plurality of sidelink processes for transmitting data of a same service type are one set of sidelink processes; determining that a plurality of sidelink processes for transmitting data of a same set of logical channels are one set of sidelink processes, where data packets on the same set of logical channels have a same destination address or have a same source address and a same destination address pair; or determining that a plurality of sidelink processes having a same resource scheduling period are one set of sidelink processes.

The following is a detailed description in connection with exemplary embodiments of the present application.

First, for each sidelink process, resource selection or reselection of a sidelink process is triggered when any one of the trigger conditions described below is satisfied.

Trigger condition 1: a resource reselection counter for a sidelink process reaches 0, and a generated random number "a" is greater than a configured resource keeping probability (probResourceKeep). "a" denotes a random number obeying uniform distribution in [0, 1].

The generation and comparison operations of the random number "a" are performed before the counter reaches 0, for example, are performed when the counter reaches 1. Specifically, in the related art, a resource reselection counter denoted as SL_RESOURCE_RESLECTION_COUNTER is configured for each sidelink process. Each time a set of resources is selected or reselected, an initial value is set for the counter. The initial value is a random integer obeying uniform distribution. The section of the uniform distribution may vary with the resource period. Each time data is sent, the counter is reduced by 1.

Trigger condition 2: no transmission is performed for a continuous period of time on a selected set of resources, for example, no transmission is performed for a continuous period of 1 second.

Trigger condition 3: similar to trigger condition 2, a higher layer defines a parameter sl-ReselectAfter, and the number of continuous untransmitted resources on a selected sidelink grant is equal to sl-ReselectAfter.

Trigger condition 4: no corresponding resource is selected for the sidelink processes, that is, the sidelink grant has not been configured. This is typically for the first resource selection.

Trigger condition 5: the configured sidelink grant no longer satisfies the transmission requirement. For example, the data packet cannot be carried even an allowed maximum modulation and coding mechanism (MCS) is used. In addition, the MAC chooses not to divide the data packet.

Trigger condition 6: the configured sidelink grant no longer satisfies a delay requirement of data, and the MAC does not perform temporary dynamic scheduling for a service.

Trigger condition 7: the resource pool is configured or reconfigured.

The present application provides a method for triggering at least one of resource selection or resource reselection. For one set of sidelink processes, the specific manner includes the following methods and combination thereof.

Figure 5:
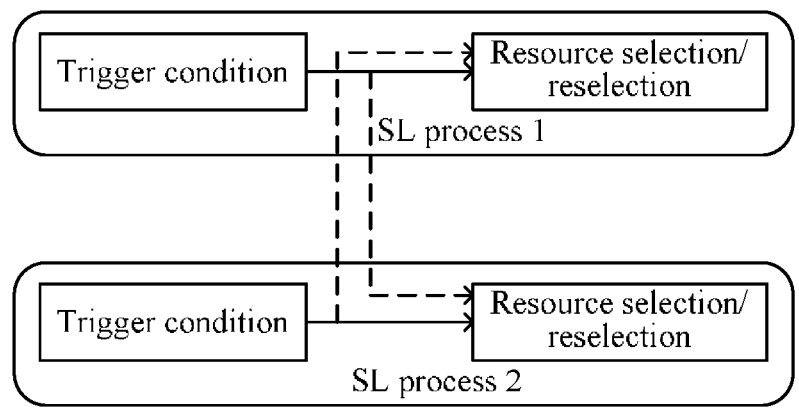
FIG. 5 is a schematic diagram illustrating that one process can trigger at least one of resource selection or reselection of another process.

1. When resource selection or reselection of one sidelink process in the one set of sidelink processes is triggered, resource selections or reselections of other sidelink processes in the one set of sidelink processes are triggered. FIG. 5 is a schematic diagram illustrating that one process can trigger at least one of resource selection or reselection of another process. As shown in FIG. 5, at least one of resource selection or resource reselection of two processes may be mutually triggered.

2. A counter is preconfigured or configured for the one set of sidelink processes to count the number of the associated operations of the one set of sidelink processes. When a threshold is reached, resource selection or resource reselection of the one set of sidelink processes is triggered. The associated operations may include resource selection/reselection, data transmission, and an resource period.

Figure 6:
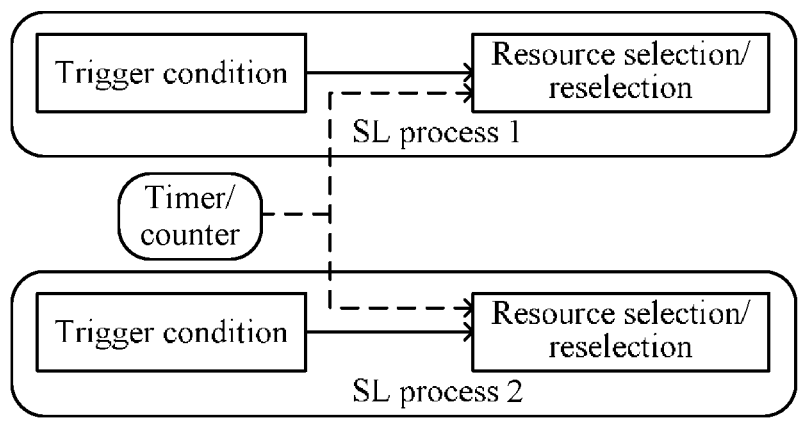
FIG. 6 is a schematic diagram illustrating that a timer or a counter is configured to trigger resource selection or reselection of a sidelink process according to an exemplary embodiment of the present application.

Alternatively, a timer is preconfigured or configured for the one set of sidelink processes. When the timer expires, resource selection or resource reselection of the one set of sidelink processes is triggered. FIG. 6 is a schematic diagram illustrating that a timer or a counter is configured to trigger resource selection or reselection of a sidelink process according to an exemplary embodiment of the present application. As shown in FIG. 6, the timer or the counter may trigger resource selection or resource reselection of the process.

3. A set of resource pools corresponding to the one set of sidelink processes change. For example, carrier reselection is performed.

In sidelink communication, physical resources available for transmitting sidelink signals constitute a sidelink resource pool, for example, a physical sidelink control channel (PSCCH) resource pool for transmitting sidelink control messages or a physical sidelink sharing channel (PSSCH) resource pool for transmitting sidelink data. One sidelink resource pool is generally configured on one carrier. Resource selection/reselection of a sidelink process also generally refers to sidelink resource selection/reselection on a resource pool. A correspondence exists between carriers, resource pools and sidelink processes, so carriers, resource pools, and sidelink processes are not strictly distinguished from each other in the description herein. That is, the operation for sidelink processes may be understood as the operation for carriers and resource pools.

Method one: In one set of sidelink processes, when resource selection or reselection of one of the processes is triggered, resource selection or reselection of other sidelink processes in the one set of sidelink processes may be triggered.

Example One

A UE performs transmission on multiple carriers by using multiple sidelink processes (additionally, multiple sidelink processes may be present on one carrier), and the multiple sidelink processes on the multiple carriers are configured as one set of sidelink processes. For example, the UE performs transmission by using N sidelink processes, and M of the N sidelink processes form one set of sidelink processes. The one set of sidelink processes is denoted as one sidelink process set A (Set-A). For example, in a special case, the M sidelink processes are in one-to-one correspondence with M carriers CC. Each sidelink process in the set has a trigger condition capable of triggering its resource selection/reselection, for example, the preceding trigger conditions 1 to 7. In order to avoid half duplex and to perform reasonable resource selection of multiple processes on multiple carriers, one trigger condition for sidelink resource selection/reselection is defined such that once the trigger condition for resource selection/reselection of a certain sidelink process in the set is satisfied, resource selections/reselections of other sidelink processes in the set are triggered.

Specifically, the trigger condition corresponding to sidelink process i in the set may also be the trigger condition for sidelink process j in the set, or resource selection/reselection of sidelink process i in the set being triggered is the trigger condition for sidelink process j in the set.

Example Two

As described in example one, if triggering of resource selection/reselection of one sidelink process causes triggering of resource selections/reselections of other sidelink processes, a UE may perform resource selection/reselection too frequently, increasing the burden of the system. Example two provides a feasible solution for reducing the number of resource selections/reselections.

First, for one set of sidelink processes, only some sidelink processes in the set are allowed to trigger resource selection/reselection of other sidelink processes. For example, one set of sidelink processes includes processes 1, 2, 3 and 4. Processes 1 and 2 are configured to be able to trigger resource selection of other sidelink processes. For example, when resource selection/reselection of process 1 is triggered, resource selections of sidelink processes 2, 3 and 4 are triggered; but when the trigger condition for process 3 is satisfied, resource selection/reselection of only process 3 is triggered.

Second, it is feasible to allow only some trigger conditions corresponding to the one set of sidelink processes to trigger resource selections of other sidelink processes. For example, trigger condition 1 is allowed to trigger resource selections/reselections of other sidelink processes while trigger conditions 2 to 7 are allowed to trigger resource selections/reselections of only corresponding processes.

Third, when one trigger condition is satisfied, multiple sidelink processes triggered may be a subset of the one set of sidelink processes.

The preceding three methods may be used in combination or used separately. The following gives one type of general description.

A set Set-A includes M sidelink processes (process 1, process 2, . . . , process M). For a sidelink process i in the set Set-A, a set of resource selection/reselection trigger conditions associated with sidelink process i is a trigger condition set specific to the sidelink process i. A set of generic trigger conditions (applicable to this set of sidelink processes) is denoted as Set-Y. When trigger condition j in Set-Y is satisfied, resource selection/reselection of Set-A is triggered, that is, resource selection/reselection of this set of sidelink processes is triggered. It is also feasible to trigger only some sidelink processes in Set-A. For example, when the generic trigger condition j is satisfied, resource selection of only Set-A (j) is triggered. Set-A(j) is a subset of Set-A, and refers to sidelink processes whose resource selection can be triggered by generic trigger condition j. The set of generic trigger conditions is derived from specific trigger conditions of each process in this set of sidelink processes. Specifically, it is feasible to select the specific trigger conditions of some sidelink processes to serve as the generic trigger condition. Set-Y={Set-Y(1), Set-Y(2), . . . Set-Y(M)}. { . . . } can be understood as the operation of taking a collection. Set-Y(i) is a subset of Set-X(i). Set-Y(i) indicates a set of generic trigger conditions selected from Set-X(i), the trigger condition for process i.

The preceding may also be described in terms of one sidelink process, and the two have an equivalent effect. It is to be noted that other examples herein may also be described in terms of one sidelink process. Such mode of description also has an equivalent effect. Such mode of description is used in this example and can also be used in other examples.

Resource selection/reselection of sidelink process i is triggered when one of the following trigger conditions is satisfied: The trigger condition in the related art is satisfied. For example, any trigger condition (trigger condition 1, 2, . . . or 7) in Set-X(i), the trigger condition specific to process i, is satisfied. Alternatively, a newly defined generic trigger condition is satisfied. For example, a trigger condition in Set-Y is satisfied, equivalent to resource selection/reselection of other sidelink processes. Although applicable to multiple sidelink processes, this trigger condition has the same effect in terms of resource selection/reselection of each sidelink process.

In the preceding method, if Set-Y contains all trigger conditions corresponding to all sidelink processes and if the trigger condition is satisfied, then resource selection/reselection of all sidelink processes is always triggered. This is equivalent to the description of example one.

Example Three

As described in example one and example two, resource selection/reselection of one sidelink process may be triggered by the trigger condition corresponding to the sidelink process, by the trigger condition of another sidelink process or by the preceding generic trigger condition. This example illustrates that resource selection/reselection triggered by a specific trigger condition corresponding to each existing sidelink process is reduced while resource selection/reselection of multiple sidelink processes is triggered by a newly defined trigger condition. For example, the trigger condition corresponding to one sidelink process is disabled from triggering resource selection/reselection. In this manner, independent resource selection/reselection of each sidelink process can be reduced and the half duplex can be further reduced. Using an example in which trigger condition 1, a resource reselection counter and a configured resource keeping probability (probResource Keep) are used, the method is described below.

Sidelink processes #1, #2, #3 and #4 are a set of sidelink processes. Trigger condition 1 for sidelink process #1 is enabled and used as a generic trigger condition to trigger resource selection/reselection of sidelink processes #1, #2, #3 and #4. Trigger conditions 1 for sidelink processes #2, #3 and #4 are disabled or trigger condition 2 for sidelink process #2 is disabled. In an embodiment, there is no necessary correlation between which trigger condition is a generic trigger condition and which generic trigger condition is disabled.

Resource selection/reselection of sidelink processes #1, #2, #3 and #4 is triggered if the resource reselection counter of sidelink process #1 is 0 and the generated random number A is greater than the configured resource keeping probability (probResourceKeep). In this case, resource selection/reselection of sidelink processes #2, #3 and #4 is not triggered by the respective trigger conditions 1 of sidelink processes #2, #3 and #4.

The method for disabling the trigger condition for one sidelink process is described below.

(1) When an enable flag is provided for the trigger condition and set to "false", the trigger condition is disabled.

(2) The parameter of the original trigger condition is set to a special value. Specifically, for trigger condition 1, a uniform resource keeping probability (probResourceKeep) is provided for a UE in the related art, and the probability is set to a value less than 1. In this example, it is feasible to set the resource keeping probability (probResourceKeep) to a value equal to 1 or a value greater than 1 to disable trigger conditions 1 for all sidelink processes or it is feasible to set one resource keeping probability (probResourceKeep) to a value equal to 1 or a value greater than 1 (indicating that resources are always kept) for each sidelink process/carrier/resource pool of the UE separately. For example, when the probResourceKeep corresponding to a certain sidelink process/carrier/resource pool is set to 1, it is indicated that the sidelink process is disabled or trigger condition 1 for the sidelink process on the carrier/resource pool is disabled. Alternatively, it is feasible to set the initial value of the resource reselection counter of one sidelink process or the random interval of the initial value to a special value (an unusable value), indicating that trigger condition 1 is disabled.

Method two: A counter/timer is preconfigured/configured for a set of sidelink processes.

Unlike method one, in the method two, a trigger condition of each sidelink process is not used as a common trigger condition for multiple sidelink processes, but a new trigger condition is used for this set of sidelink processes.

Example Four

A counter is preconfigured/configured for a set of sidelink processes to count the number of times resource selection/reselection of this set of processes is performed. When the number of times reaches a threshold, resource selection/reselection of this set of sidelink processes is triggered. The details are described below.

Sidelink processes #1, #2, #3 and #4 are a set of sidelink processes denoted as Set-A. A resource selection/reselection counter is configured for this set of sidelink processes to count the number of independently-triggered resource selection/reselections of the four sidelink processes. Such count may be an incremental count or a decremental count. For example, the initial value of the counter is set to 3. Each time resource selection/reselection of any one of sidelink processes #1, #2, #3 and #4 is triggered, the counter is reduced by 1 until the value of the counter is 0. When the value of the counter is 0, resource selection/reselection of sidelink processes #1, #2, #3 and #4 is triggered. As another example, the initial value of the counter is set to 1. Once resource selection/reselection of any one of sidelink processes #1, #2, #3 and #4 is triggered, resource selection/reselection of sidelink processes #1, #2, #3 and #4 is triggered.

Further, in all embodiments of the present application, if resource selection/reselection of a set of sidelink processes is triggered, the resource reselection counter (SL_RESOURCE_RESLECTION_COUNTER) of all sidelink processes may be reset.

In this example, the resource selection/reselection counter may count the number of executed resource selection/reselection of only some sidelink processes. For example, the number of resource selection/reselection of only sidelink processes #1 and #2 is counted. That is, the number of resource selection/reselection of only all sidelink processes in Set-B, a subset of Set-A, is counted.

Example Five

A counter is preconfigured/configured for a set of sidelink processes. Unlike example four, what is counted may be a parameter other than the number of executed resource selection/reselection of this set of processes. This parameter may be, for example, the number of transmissions of some or all of the processes in this set of processes or the number of resource periods that this set of sidelink processes passes since the previous resource selection/reselection. The resource period is one time granularity indicating the interval between two transmissions of periodically transmitted data. Specifically, for example, a counter is configured for a set of sidelink processes, and the initial value of the counter is a preset value or a value randomly selected within a value range. After the counting condition of the counting parameter is satisfied in this set of sidelink processes, the counter is decremented. When the value of the counter is decremented to 0, resource selection/reselection of all processes is triggered. Alternatively, a preset value or a value randomly selected within a value range is used as a counter threshold. After the counting condition of the counting parameter is satisfied in this set of sidelink processes, the counter is incremented. When the value of the counter is incremented to the counter threshold, resource selection/reselection of all processes is triggered.

Alternatively, the counter is associated with certain state parameters of the current set of sidelink processes. If more subframes are occupied on multiple carriers, a more serious half duplex occurs. If subframes transmitted on the multiple carriers are the same subframe, the half duplex is alleviated. A counter parameter is set to count the proportion or number of occupied time domain resources (subframes/time slots) (or other resources such as frequency domain resources, space domain resources and code domain resources) in the preceding one resource period. A threshold is set. The threshold may be an occupation proportion or the number of occupied subframes. If excessive time domain resources are occupied, that is, the counted proportion or number of occupied time domain resources exceeds the threshold, resource selection/reselection of this set of sidelink processes is triggered. For example, data of a set of sidelink processes #1, #2, #3 and #4 is transmitted on four carriers, the resource period of transmission is 20 milliseconds (20 ms), and the occupation threshold is set to 8 or the proportion is set to 0.4 (the number of occupation is 8/the resource period is 20). When the number of occupied time domain subframes of a set of sidelink processes reaches 8, resource selection/reselection of this set of sidelink processes is triggered.

Example Six

A timer is preconfigured/configured for a set of sidelink processes. When the timer expires, resource selection/reselection of this set of sidelink processes is triggered and the initial value of the timer is reset for retiming, that is, the timer periodically triggers resource selection/reselection of this set of sidelink processes.

It is to be noted that in the case of no collision, all the examples in the present disclosure can be combined with the method for disabling related trigger conditions described in example three. For example, it is feasible to use the timer method described in example six to trigger resource selection/reselection of a set of sidelink processes and use the method described in example three to disable the original trigger condition 1 for this set of sidelink processes.

Method three: a set of resources corresponding to a set of sidelink processes is changed. For example, carrier selection is performed.

Example Seven

Carrier aggregation refers to a transmission technology using multiple carrier processes. Sidelink may also use the carrier aggregation technology. A typical method of using carrier aggregation is that the UE transmits multiple sidelink processes on multiple carriers. For example, the UE transmits a service by using sidelink processes #1, #2, #3 and #4, and it is assumed that sidelink processes #1, #2, #3 and #4 use resources on carriers CC#1, CC#2, CC#3 and CC#4, respectively.

Generally, the carriers used by the UE are not unchanged. With the change such as the change of the channel busy ratio (CBR) of each carrier, the change of the capability limitation of the UE, and the change of the service to be transmitted, the UE may perform transmission on different carrier sets that are selected at different time points. That is, one aspect of carrier aggregation includes carrier selection/reselection. Resource selection/reselection of a sidelink process may trigger carrier reselection. When carrier reselection of a carrier set corresponding to a set of sidelink processes occurs, resource reselections of all processes are triggered. That is, the change of the carrier set used by the UE can cause the UE to perform data transmission on new resources that are selected on new carriers. Thus, resource selection/reselection of a sidelink process can be triggered by carrier selection/reselection.

Therefore, in this example, a new trigger condition for resource selection/reselection of a sidelink process may be the condition described below.

The UE performs carrier selection/reselection or the carrier set used by the UE changes. That is, carrier selection/reselection can trigger resource selection/reselection of a set of sidelink processes.

Example Eight

The trigger conditions for resource selection/reselection of a set of sidelink processes are described in examples one to six. Since resource selection/reselection may trigger carrier selection/reselection, the resource selection/reselection trigger conditions described in the preceding examples may also be used as the trigger conditions for carrier reselection, and carrier reselection further causes resource reselection. For example, trigger conditions for carrier selection/reselection include, but are not limited to, the conditions described below.

(1) Similar to example one, selection/reselection of carriers may be triggered by resource selection/reselection of sidelink processes carried on these carriers. It is assumed that the UE transmits a service by using sidelink processes #1, #2, #3 and #4. It is assumed that sidelink processes #1, #2, #3 and #4 use resources on carriers CC #1, CC #2, CC #3 and CC #4, respectively. It is assumed that resource reselection of sidelink process #1 is performed and this resource reselection triggers carrier reselection. The carrier reselection result is carriers CC #1, CC #2 and CC #3. The change of the carrier set is used as the trigger condition for resource reselection of the set of sidelink processes. That is, data transmission of processes #1, #2, #3 and #4 need new resources. For example, the sidelink process corresponding to CC #4 may be switched to another carrier. Alternatively, the sidelink process corresponding to CC #4 may be released and a new process (which is located on carrier CC #1, CC #2 or CC #3) is generated to carry data of the original sidelink process.

(2) Similar to example two, a set of carriers or a set of sidelink processes may be defined, and carrier selection/reselection can be triggered only when resource selection/reselection of these carriers/processes is performed.

(3) Similar to examples four, five and six, a counter/timer may be defined to trigger carrier selection/reselection according to the state/operation of a set of sidelink processes, or a timer may be defined to trigger carrier selection/reselection.

Carrier selection/reselection may be triggered by the change of factors such as the channel busy ratio (CBR) of each carrier, the capability limitation of the UE, and the service to be transmitted in addition to the preceding resource selection/reselection. This is not the focus of the present disclosure and will not be described here. No matter what trigger condition triggers carrier selection/reselection, resource selection/reselection of a set of sidelink processes can be triggered as described in example seven.

Example Nine

In some cases, although no carrier reselection is performed, the resource pool on the carrier may be changed. In these cases, and selection/reselection of sidelink processes corresponding to the carriers may be triggered. For example, in the case of sidelink carrier aggregation, the synchronization reference or synchronization reference source of multiple carriers may be changed. As a result, resource pools on these carriers may be changed. In this case, resource selection/reselection is required.

The synchronization reference or synchronization reference source of carriers used for carrier aggregation may be changed. For example, the timing of the currently aggregated carriers is switched from Global Navigation Satellite System (GNSS) timing to base station timing. For example, the UE transmits a service by using resources on the carriers CC #1, CC #2, CC #3 and CC #4. Carriers CC #1, CC #2, CC #3 and CC #4 have consistent timing. For example, at the beginning, all of the carriers use GNSS timing. However, due to the movement of the UE, GNSS timing becomes unreliable and the aggregated carriers are switched from GNSS timing to base station timing. Although the carrier set does not change, the used timing is changed. Thus, resource selection of sidelink processes on these aggregated carriers is required.

Example Ten

This example is used for illustrating the selection criterion for a set of sidelink processes in any one of examples one to nine.

This set of sidelink processes is used for transmission of data of the same logical channel. As a typical example, one logical channel may be transmitted on multiple carriers, and one sidelink process is established on each carrier for transmission of data of this logical channel.

Alternatively, this set of sidelink processes is used for transmission of data of the same service type. As a typical example, at least one logical channel may be established for one service, and the data is transmitted on multiple carriers. Thus, one sidelink process may be established on each carrier for transmission of data of the at least one logical channel.

Alternatively, this set of sidelink processes is used for transmission of data of the same set of logical channels. Data packets of this set of logical channels have the same destination address (destination ID) or source address/destination address pair (source ID/destination ID pair). As a typical example, if the data packets of multiple logical channels have the same destination address, the data packets may be aggregated in the same data unit for transmission, and if the data of the logical channels are transmitted on multiple carriers, one sidelink process may be established on each carrier for transmission of data of the at least one logical channel.

Alternatively, this set of sidelink processes has the same resource scheduling period.

From the description of the preceding implementations, it will be apparent to those skilled in the art that the method of any one of the preceding embodiments may be implemented by use of software plus a necessary general-purpose hardware platform, or may, of course, be implemented by hardware. Based on this understanding, the solution provided in the present application substantially, or the part contributing to the related art, may be embodied in the form of a software product. The software product is stored in a storage medium such as a Random Access Memory (ROM)/Random Access Memory (RAM), a magnetic disk or an optical disk and includes several instructions for enabling a terminal (which may be a mobile phone, a computer, a server or a network device) to perform the method according to each embodiment of the present application.

Embodiment Two

An embodiment of the present application further provides a resource selection device configured to implement the preceding embodiments and exemplary implementations. What has been described will not be repeated. As used below, the term "module" is implemented by at least one of software or hardware capable of implementing preset functions. The device of the following embodiment may be implemented by software, but implementation by hardware or by a combination of software and hardware is also possible and conceived.

According to another embodiment of the present application, a resource selection device is provided. The device includes an initiation module, a determination module and a trigger module.

The initiation module is configured to initiate at least one sidelink process on at least one carrier.

The determination module is configured to determine that the at least one sidelink process is one set of sidelink processes.

The trigger module is configured to trigger, according to a preset rule, resource selection of the one set of sidelink processes.

In an embodiment, at least one sidelink process is initiated on one carrier or at least one sidelink process is initiated on multiple carriers.

With the above solution, a serious half duplex caused by the independent sidelink process of each carrier in carrier aggregation in the related art is avoided and achieves resource selection for one set of sidelink processes. Independent execution of the sidelink process of each carrier and the serious half duplex are avoided.

In an embodiment, triggering, according to the preset rule, the resource selection of the one set of sidelink processes includes at least one of: based on a determination that resource selection of one sidelink process in the one set of sidelink processes is triggered, triggering the resource selection of the one set of sidelink processes; according to a counter or a timer configured for the one set of sidelink processes in advance, triggering the resource selection of the one set of sidelink processes; or based on a determination that carrier selection corresponding to the one set of sidelink processes is performed or a resource pool corresponding to the one set of sidelink processes changes, triggering the resource selection of the one set of sidelink processes.

In an embodiment, the step of based on the determination that the resource selection of the one sidelink process in the one set of sidelink processes is triggered, triggering the resource selection of the one set of sidelink processes includes one of determining that the triggering of the resource selection of the one sidelink process is used as a trigger condition for resource selection of other sidelink processes in the one set of sidelink processes other than the one sidelink process; or determining that the trigger condition for the resource selection of the other sidelink processes in the one set of sidelink processes other than the one sidelink process is identical with a trigger condition for the one sidelink process.

In an embodiment, the step of based on the determination that the resource selection of the one sidelink process in the one set of sidelink processes is triggered, triggering the resource selection of the one set of sidelink processes includes at least one of: based on a determination that the one sidelink process is a sidelink process of a preset set in the one set of sidelink processes, after the resource selection of the one sidelink process is triggered, triggering the resource selection of the one set of sidelink processes; in a case where the one sidelink process has a plurality of trigger conditions, allowing some trigger conditions of the plurality of trigger conditions to trigger the resource selection of the one sidelink process and resource selection of other sidelink processes in the one set of sidelink processes other than the one sidelink process; or after determining that the resource selection of the one sidelink process is triggered, triggering resource selection of some sidelink processes in the one set of sidelink processes.

In an embodiment, triggering, according to the preset rule, the resource selection of the one set of sidelink processes includes disabling some trigger conditions corresponding to some sidelink processes in the one set of sidelink processes.

In an embodiment, these sidelink processes are sidelink processes in the one set of sidelink processes other than the one sidelink process.

In an embodiment, the trigger condition of the sidelink process is disabled in at least one of the following manners: setting an enable flag for the trigger condition corresponding to the sidelink process; and in response to disabling one trigger condition corresponding to the sidelink process, setting the enable flag of the one trigger condition to "false"; or setting a reference value of the trigger condition corresponding to the sidelink process to a predetermined value.

In an embodiment, the step of according to the preconfigured counter or the timer of the one set of sidelink processes, triggering the resource selection of the one set of sidelink processes includes one of: after determining that the counter reaches a preset value, triggering the resource selection of the one set of sidelink processes, where the counter is configured to count an associated-state variable or the execution number of an associated operation of the one set of sidelink processes; or after determining that the timer expires, triggering the resource selection of the one set of sidelink processes.

In an embodiment, the counter is configured to count the associated-state variable or the execution number of the associated operation of the one set of sidelink processes in one of the following manners: the counter is configured to count the number of independently-triggered resource selection of some or all sidelink processes in the one set of sidelink processes; the counter is configured to count the number of data transmissions of some or all sidelink processes in the one set of sidelink processes; the counter is configured to count a number of resource periods that the one set of sidelink processes passes since the previous resource selection; or the counter is configured to count a number of resources occupied by the one set of sidelink processes in one resource period, where the resources include at least one of a time domain resource, a frequency domain resource, a space domain resource or a code domain resource.

In an embodiment, the determination that the carrier selection corresponding to the one set of sidelink processes is performed or the resource pool corresponding to the one set of sidelink processes changes includes one of: a determination that synchronization reference resources configured for the resource pool corresponding to the one set of sidelink processes changes; or a determination that carrier selection or carrier set selection is performed for a carrier corresponding to the one set of sidelink processes, or a synchronization reference or a synchronization reference source of the carrier corresponding to the one set of sidelink processes changes.

In an embodiment, before determining that the carrier selection or the carrier set selection is performed for the resource pool corresponding to the one set of sidelink processes, the method further includes one of: in response to determining that the resource selection of one sidelink process in the one set of sidelink processes is triggered, triggering the carrier selection or the carrier set selection; in response to determining that carrier selection is performed for some carriers in a carrier set or resource selection is performed for some sidelink processes in the one set of sidelink processes, triggering the carrier set selection of the carrier set; or according to the preset counter or timer, triggering the carrier selection or the carrier set selection, where the counter is configured to count the execution number of associated operations of the one set of sidelink processes.

In an embodiment, determining that at least one sidelink process is one set of sidelink processes includes one of: determining that a plurality of sidelink processes for transmitting data of a same logical channel are one set of sidelink processes; determining that a plurality of sidelink processes for transmitting data of a same service type are one set of sidelink processes; determining that a plurality of sidelink processes for transmitting data of a same set of logical channels are one set of sidelink processes, where data packets on the same set of logical channels have a same destination address or have a same source address and a same destination address pair; or determining that a plurality of sidelink processes having a same resource scheduling period are one set of sidelink processes.

It is to be noted that the various modules described above may be implemented by software or hardware. Implementation by hardware may, but may not necessarily, be performed by the following method: the various modules described above are located in a same processor; or, in any combination, the various modules are located in different processors.

Embodiment Three

According to another embodiment of the present application, an electronic device is provided. The electronic device includes a memory and a processor. The memory stores a computer program. The processor is configured to execute the computer program to perform the method provided in any one of the preceding embodiments.

Embodiment Four

According to another embodiment of the present application, a storage medium is provided. The storage medium stores a computer program. When the computer program is executed, the method provided in any one of the preceding embodiments is performed.

In an embodiment, for examples in this embodiment, reference may be performed to the examples described in the preceding embodiments and implementations, and the examples will not be repeated in this embodiment.

Those skilled in the art should know that each preceding module or step of the present application may be implemented by a universal computing device, they may be concentrated on a single computing device or distributed in a network formed by multiple computing devices, and in an embodiment, they may be implemented by program codes executable by the computing devices, so that they may be stored in a storage device for execution by the computing devices, and in some circumstances, the illustrated or described steps may be executed in sequences different from those described herein, or they may be performed into various integrated circuit modules separately, or multiple modules or steps therein may be performed into a single integrated circuit module for implementation. Therefore, the present application is not limited to any specific combination of hardware and software.

What is claimed is:

1. A resource selection method, comprising:
    initiating a first set of sidelink processes on a first set of carriers comprising at least one carrier, wherein the first set of sidelink processes comprises a plurality of sidelink processes;
    triggering, in response to satisfying a trigger condition for a resource selection of one sidelink process of the first set of sidelink processes, a carrier selection to obtain a selected second set of carriers, wherein the second set of carriers is selected based on channel busy ratio of each candidate carrier;

initiating a second set of sidelink processes on the selected second set of carriers; and triggering, according to a preset rule, resource selection of the second set of sidelink processes, comprising:

based on a determination that the carrier selection corresponding to the first set of sidelink processes is performed, triggering the resource selection of the second set of sidelink processes on the selected second set of carriers, comprising:

when the selected second set of carriers is not the same as the first set of carriers, triggering the second set of sidelink processes to select new resources on the selected second set of carriers for data transmission; and when the selected second set of carriers is the same as the first set of carriers, triggering the second set of sidelink processes to select new resources on the selected second set of carriers for data transmission.

2. The method of claim 1, wherein triggering, according to the preset rule, the resource selection of the second set of sidelink processes comprises:

disabling some trigger conditions corresponding to some sidelink processes in the second set of sidelink processes.

3. The method of claim 2, wherein the trigger condition for the sidelink process is disabled in at least one of the following manners:

setting an enable flag for the trigger condition corresponding to the sidelink process; and in response to disabling one trigger condition corresponding to the sidelink process, setting the enable flag of the one trigger condition to "false"; or setting a reference value of the trigger condition corresponding to the sidelink process to a predetermined value.

4. The method of claim 1, wherein the method further comprises one of:

the first set of sidelink processes is used for transmission of data of a same logical channel;

the first set of sidelink processes is used for transmission of data of a same service type;

the first set of sidelink processes is used for transmission of data of a same set of logical channels, wherein data packets on the same set of logical channels have a same destination address or have a same source address and a same destination address pair; or the first set of sidelink processes has a same resource scheduling period.

5. The method of claim 1, wherein the determination that the carrier selection corresponding to the first set of sidelink processes is performed comprises one of:

a determination that carrier set selection is performed for the at least one carrier corresponding to the first set of sidelink processes, or a synchronization reference or a synchronization reference source of the at least one carrier corresponding to the first set of sidelink processes changes.

6. The method of claim 1, wherein the trigger condition for the resource selection comprises one of the following:

a resource reselection counter of the sidelink process reaches 0, and a generated random number obeying uniform distribution in [0, 1] is greater than a configured resource keeping probability;

no data is transmitted on a selected set of resources during a predetermined time;

a higher layer defines a parameter sl-ReselectAfter, and a number of untransmitted continuous resources of a selected sidelink grant is equal to sl-ReselectAfter;

no corresponding resource is selected for the sidelink process;

the configured sidelink grant no longer satisfies a transmission requirement, and a medium access control (MAC) chooses not to divide a data packet;

the configured sidelink grant no longer satisfies a delay requirement of data, and the MAC does not perform temporary dynamic scheduling for a service; or the resource pool is configured.

7. The method of claim 1, wherein when the selected second set of carriers is not the same as the first set of carriers, the second set of carriers comprises a plurality of carriers, and the selected second set of carriers is partially the same as the first set of carriers.

8. A non-transitory storage medium storing a computer program, wherein when the computer program is executed, a resource selection method is performed, wherein the resource selection method comprises:

initiating a first set of sidelink processes on a first set of carriers comprising at least one carrier, wherein the first set of sidelink processes comprises a plurality of sidelink processes;

triggering, in response to satisfying a trigger condition for a resource selection of one sidelink process of the first set of sidelink processes, a carrier selection to obtain a selected second set of carriers, wherein the second set of carriers is selected based on channel busy ratio of each candidate carrier;

initiating a second set of sidelink processes on the selected second set of carriers; and triggering, according to a preset rule, resource selection of the second set of sidelink processes, comprising:

based on a determination that the carrier selection corresponding to the first set of sidelink processes is performed, triggering the resource selection of the second set of sidelink processes on the selected second set of carriers, comprising:

when the selected second set of carriers is not the same as the first set of carriers, triggering the second set of sidelink processes to select new resources on the selected second set of carriers for data transmission; and when the selected second set of carriers is the same as the first set of carriers, triggering the second set of sidelink processes to select new resources on the selected second set of carriers for data transmission.

9. The non-transitory storage medium of claim 8, wherein the resource selection method further comprises one of:

the first set of sidelink processes is used for transmission of data of a same logical channel;

the first set of sidelink processes is used for transmission of data of a same service type;

the first set of sidelink processes is used for transmission of data of a same set of logical channels, wherein data packets on the same set of logical channels have a same destination address or have a same source address and a same destination address pair; or the first set of sidelink processes has a same resource scheduling period.

10. The non-transitory storage medium of claim 8, wherein when the selected second set of carriers is not the same as the first set of carriers, the second set of carriers comprises a plurality of carriers, and the selected second set of carriers is partially the same as the first set of carriers.

11. An electronic device, comprising a memory and a processor, wherein the memory stores a computer program and the processor is configured to execute the computer program to perform a resource selection method, wherein the resource selection method comprises:
  initiating a first set of sidelink processes on a first set of carriers comprising at least one carrier, wherein the first set of sidelink processes comprises a plurality of sidelink processes;
  triggering, in response to satisfying a trigger condition for a resource selection of one sidelink process of the first set of sidelink processes, a carrier selection to obtain a selected second set of carriers, wherein the second set of carriers is selected based on channel busy ratio of each candidate carrier;
  initiating a second set of sidelink processes on the selected second set of carriers; and
  triggering, according to a preset rule, resource selection of the second set of sidelink processes, comprising:
  based on a determination that the carrier selection corresponding to the first set of sidelink processes is performed, triggering the resource selection of the second set of sidelink processes on the selected second set of carriers, comprising:
    when the selected second set of carriers is not the same as the first set of carriers, triggering the second set of sidelink processes to select new resources on the selected second set of carriers for data transmission; and
    when the selected second set of carriers is the same as the first set of carriers, triggering the second set of sidelink processes to select new resources on the selected second set of carriers for data transmission.

12. The electronic device of claim 11, wherein the resource selection method further comprises one of:
  the first set of sidelink processes is used for transmission of data of a same logical channel;
  the first set of sidelink processes is used for transmission of data of a same service type;
  the first set of sidelink processes is used for transmission of data of a same set of logical channels, wherein data packets on the same set of logical channels have a same destination address or have a same source address and a same destination address pair; or
  the first set of sidelink processes has a same resource scheduling period.

13. The electronic device of claim 11, wherein when the selected second set of carriers is not the same as the first set of carriers, the second set of carriers comprises a plurality of carriers, and the selected second set of carriers is partially the same as the first set of carriers.

* * * * *